R. B. PRICE.
METHOD OF MAKING CONVEYER BELTS.
APPLICATION FILED MAR. 18, 1914.

1,211,350.

Patented Jan. 2, 1917.

Witnesses:
Veronica Braun
Fred C. Batcheller

Raymond B. Price Inventor
By his Attorney

UNITED STATES PATENT OFFICE.

RAYMOND B. PRICE, OF NEW YORK, N. Y., ASSIGNOR TO RUBBER REGENERATING COMPANY, A CORPORATION OF INDIANA.

METHOD OF MAKING CONVEYER-BELTS.

1,211,350.  Specification of Letters Patent. Patented Jan. 2, 1917.

Application filed March 18, 1914. Serial No. 825,689.

*To all whom it may concern:*

Be it known that I, RAYMOND B. PRICE, a citizen of the United States, and a resident of New York, county and State of New York, have invented certain new and useful Improvements in Methods of Making Conveyer-Belts, of which the following is a full, clear, and exact description.

The invention relates to conveyer belts and the art or method of making the same, and more particularly to a conveyer belt having incorporated therein superimposed plies or layers of fibrous material and rubber, or other vulcanizable material.

By my invention I aim to produce a belt in a manner which will result in a structure, wherein that surface subjected to the abrading action of the load, will be so compressed and compacted as to withstand wear thereon from the load to a degree to prolong the life of the belt. I also aim to produce a belt in which the compactness or density of the wear face when in use as a carrying surface, will be greatest toward the bottom of the trough, or that point of the belt, which, in use is subjected to the greatest wear, a condition arising in part from the depression of the belt to form a trough when in use upon the conveyer structure, and in part from the formation of the belt itself.

The invention consists primarily in a flexible conveyer belt embodying therein a body including therein a stratum of fibrous material, the load carrying surface of which consists of vulcanized rubber, one face of which is permanently united to said body and the portion of which, contiguous to its other face, is under compression when the belt is flat, whereby a highly elastic compressed or compacted wear surface for the belt is secured; and in other novel features of construction and in the novel method of producing the same, all as hereinafter described and as more particularly pointed out in the claims hereto appended.

Figure 1:
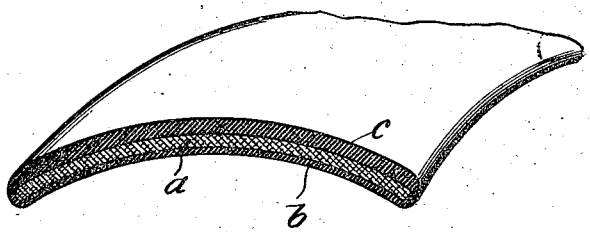
Figure 2:
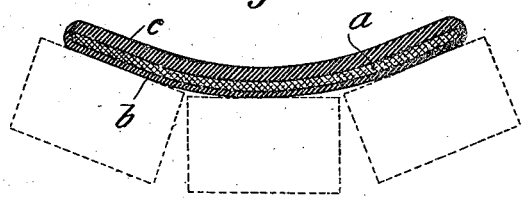

Referring to the drawings—Figure 1 is a perspective view of a portion of a conveyer belt embodying my invention; and Fig. 2 is a transverse section of such a belt shown in relation to the conveyer rollers which in said view are shown in dotted lines.

Like letters refer to like parts in both of said views.

In the embodiment of my invention shown in the drawings, I have illustrated one form of the invention which will clearly exemplify the purposes and operation of a belt made in accordance with my invention, but it is not my intention to restrict my invention to the particular form of belt shown in the drawings.

A belt made in accordance with my invention comprises a body including a stratum of fibrous material indicated at *a* in the accompanying drawings, provided upon the under surface thereof with a facing *b* of vulcanized rubber adapted to engage the driving and the saddle pulleys and an upper or wear surface *c* of vulcanized rubber adapted to receive the load. This surface is subjected to a constant abrading action from the load and the wear thereon determines the life of the belt. While I have shown in the drawings but a single ply of fibrous material, it is not my intention to limit myself as to the formation of the fabric portion of the body composed of fibrous material, as any desired arrangement thereof may be employed.

Actual practice has demonstrated that the greatest wear upon a conveyer belt occurs adjacent the longitudinal center of the belt and at the bends thereof intermediate the middle and side saddle rollers; and to minimize the effect of this wear and thus prolong the life of the belt, I provide a structure wherein the depression of the belt to form a trough will result in a high compression or compaction of the wear face thereof at that point with an incidental compression and compaction adjacent the sides thereof. This compression or compaction of the wear face of the belt will have the further advantage that in passing under the return rollers, the belt will be straightened, or partially straightened, without putting this wear surface under stretch. In other words, when the belt is flattened the surface contiguous its wear face will be under compression so that the depression of the belt to form a trough will have the effect of a high compression or compaction of the wear face thereof and upon the return of the belt, the wear surface of the lower reach thereof will still remain under slight compression, thus avoiding any tendency to stretch the wear surface to a point which would ultimately reach the limit of elasticity of the rubber of the wear face.

In that form of the invention shown in the drawings, I secure the desired results by arching the belt transversely so that the upper face thereof will normally have a convex curvature and the lower side thereof will normally have a concave curvature before mounting the belt upon the conveyer. When mounted upon the conveyer, however, the various saddle bearing rollers and the weight of the belt and of the load, will reverse this curvature so that the upper or wear face will have a concave curvature and the lower face convex curvature. Hence, the rubber wear face will be compressed or compacted, giving it greater compactness or density and higher resiliency, both of which properties will offer greater resistance to the abrading action from the load and any wear resulting from a shifting of the load thereon. In addition to arching the belt transversely as shown, I also contemplate forming the belt in sections or vulcanizing it in sections and arching each section longitudinally thereof, so that the straightening of the belt in applying it to the saddle rollers, will, in addition to or in place of the compressions above referred to, place such longitudinal stresses upon the rubber facing as to compress and compact it, longitudinally as well as laterally.

To produce a belt of the character above referred to, the belt may be built up or formed of the raw or green rubber and fibrous material in any desired manner, and subjected to the vulcanizing temperature. Thereafter, I compress and compact the rubber of the wear face on both sides of the longitudinal center of the belt, so that as the belt is troughed, this compression or compaction will be increased and thus give greater resiliency and density toward the surface of said facing. This compression may be secured in a flat belt by mechanically compressing or compacting a sheet of vulcanized rubber from the sides of the belt toward the center thereof when applying it to the body composed of fibrous material, or it may be secured by arching the belt to form a substantially regular distended convex surface as shown in Fig. 1 of the drawings after it has been, or while it is being vulcanized, any stretch being removed by the application of heat, so that a subsequent flattening of the belt will place the rubber of the wear surface under compression, the greatest degree of compression being at the surface and along the longitudinal center of the belt. Or vulcanized rubber compressed or compacted as by chilling, may be cemented upon or otherwise secured in superficial contact with the fibrous material of the belt, with the belt flat or arched, as desired. Still another manner of securing the desired compression of the rubber wear face, is by cementing or otherwise securing a vulcanized rubber sheet upon and in superficial contact with the fibrous material and compressing and compacting it by applying stresses thereto from the sides toward the center while it is being so secured. Whatever the means employed in forming the wear face, the result is a compression of the material of this face, while the belt is flat, and a much higher degree of compression thereof when the belt is troughed.

In use a belt embodying my invention presents a highly compressed or compacted wear face, when traveling upon the saddle rollers, and when passing under the return rollers there is sufficient compression of said wear face to prevent deterioration from the stretching of the rubber forming this surface.

Having described my invention, what I desire to have protected by Letters Patent is:

1. The process of making conveyer belts which comprises applying a wear facing of rubber to a strip of fibrous material and forming a substantially regular distended surface thereon adapted to provide compression when the belt is flat.

2. The process of making conveyer belts which comprises applying a wear facing of rubber to a strip of fibrous material and forming a substantially regular distended convex surface thereon.

3. The process of making conveyer belts which comprises applying a wear facing of rubber to a strip of fibrous material and forming a substantially regular distended convex surface of approximately uniform thickness thereon.

4. The process of making conveyer belts which comprises applying a wear facing of rubber to a strip of fibrous material, vulcanizing the rubber, shaping the rubber-treated material, and heating the material to set it as so shaped.

5. An art or method of making conveyer belts consisting in applying a load carrying surface of unvulcanized rubber to a body including therein a stratum of fibrous material, subjecting the belt, while flat, to the action of a vulcanizing medium, thereafter placing the rubber under stretch by arching the belt transversely with a convex upward curvature, and subjecting the arched belt to heat of a degree to remove the stretch therefrom, whereby the belt will be given a permanent arched set and the subsequent flattening thereof will place the load carrying surface under a normal compression or compaction.

6. An art or method of making conveyer belts consisting in applying a load carrying surface of unvulcanized rubber to a body including therein a stratum of fibrous material subjecting a short length section of the belt while flat to the action of a vulcanizing medium, thereafter placing the rubber surface under stretch by arching the belt transversely and longitudinally with a convex upward curvature and subjecting the arched belt to a heat of a degree to remove the stretch therefrom, whereby the belt will be given a permanent arched set both longitudinally and laterally and the subsequent flattening thereof will place the load carrying surface under a normal compression or compaction.

Signed at New York city, county and State of New York, this 11th day of January, 1914.

RAYMOND B. PRICE.

Witnesses:
    JOHN J. CASEY,
    CHARLOTTE M. SCHULER.